United States Patent
Lavrov et al.

(10) Patent No.: US 10,510,044 B2
(45) Date of Patent: Dec. 17, 2019

(54) PROJECT MANAGEMENT SYSTEM PROVIDING DIGITAL FORM-BASED INSPECTIONS IN THE FIELD

(71) Applicant: LATISTA Technologies, Inc., Reston, VA (US)

(72) Inventors: Andrei Lavrov, Chevy Chase, MD (US); Anatoliy Tishin, Reston, VA (US); Patricia Remacle, Reston, VA (US)

(73) Assignee: LATISTA TECHNOLOGIES, INC., Restin, VA (US)

( * ) Notice: Subject to any disclaimer, the term of this patent is extended or adjusted under 35 U.S.C. 154(b) by 864 days.

(21) Appl. No.: 14/592,126

(22) Filed: Jan. 8, 2015

(65) Prior Publication Data

US 2015/0193735 A1 Jul. 9, 2015

Related U.S. Application Data

(60) Provisional application No. 61/925,468, filed on Jan. 9, 2014.

(51) Int. Cl.
*G06F 17/20* (2006.01)
*G06Q 10/10* (2012.01)

(52) U.S. Cl.
CPC .................. *G06Q 10/10* (2013.01)

(58) Field of Classification Search
CPC ....................................................... G06Q 10/10
See application file for complete search history.

(56) References Cited

U.S. PATENT DOCUMENTS

| | | | |
|---|---|---|---|
| 5,664,109 A * | 9/1997 | Johnson | G06Q 40/08 705/2 |
| 7,831,628 B1 | 11/2010 | Silva et al. | |
| 8,548,992 B2 | 10/2013 | Abramoff et al. | |
| 8,583,462 B2 | 11/2013 | Podgurny et al. | |
| 8,700,310 B2 | 4/2014 | Jayanthi | |
| 8,732,125 B2 | 5/2014 | Omansky et al. | |

(Continued)

OTHER PUBLICATIONS

Defining a Linear View for a PDF Form, dated Sep. 11, 2014, pp. 1-2, Latista Server Edition On-line Help, Latista Technologies, Reston, Virginia.

(Continued)

*Primary Examiner* — Shahid K Khan
(74) *Attorney, Agent, or Firm* — Kraguljac Law Group, LLC (57) ABSTRACT

Systems and methods provide graphical form-based inspections in the field. The system includes a means for allowing a user to access digitized paper forms, such as inspection forms, in both a simplified, easy-to-complete list of questions and fields displayed in a linear form view, as well as an interactive graphical form completely replicated from the original paper document displayed in a graphical view. The system allows the user to toggle between the linear form and graphical views of the same form on the fly during an inspection process, thereby improving user interaction with and completion of inspection form or also can have a preferred view method based on limitations of a computer device or complexity of the form. The system further includes a means for allow the user to create customized workflows for the completion and tracking of inspection processes.

18 Claims, 6 Drawing Sheets

(56) References Cited

U.S. PATENT DOCUMENTS

| | | | |
|---|---|---|---|
| 2003/0018742 A1* | 1/2003 | Imago | G06Q 30/0625 709/214 |
| 2004/0128613 A1* | 7/2004 | Sinisi | G06Q 10/00 715/203 |
| 2006/0036612 A1* | 2/2006 | Harrop | G06F 17/211 |
| 2007/0083517 A1 | 4/2007 | Prince et al. | |
| 2010/0077316 A1 | 3/2010 | Omansky et al. | |
| 2011/0093619 A1 | 4/2011 | Nelson | |
| 2011/0169826 A1 | 7/2011 | Elsberg et al. | |
| 2012/0066178 A1 | 3/2012 | Omansky et al. | |
| 2012/0116728 A1 | 5/2012 | Shear et al. | |
| 2012/0310906 A1 | 12/2012 | Miller et al. | |
| 2013/0090965 A1 | 4/2013 | Rivere | |
| 2013/0179354 A1 | 7/2013 | Seat | |
| 2013/0198628 A1* | 8/2013 | Ethier | G06F 3/0484 715/709 |
| 2013/0235029 A1 | 9/2013 | Keough et al. | |
| 2013/0304533 A1 | 11/2013 | Nudd et al. | |
| 2013/0338971 A1 | 12/2013 | Chao et al. | |
| 2014/0033011 A1* | 1/2014 | Wandeler | G06F 17/243 715/222 |
| 2014/0039955 A1 | 2/2014 | Lee et al. | |
| 2014/0059416 A1* | 2/2014 | Jaffe | G06F 17/243 715/224 |
| 2014/0258825 A1* | 9/2014 | Ghosh | G06F 17/243 715/222 |
| 2015/0112647 A1* | 4/2015 | Currin | G06Q 50/06 703/1 |

OTHER PUBLICATIONS

Babak Jalalzadeh Fard, Construction smart forms: an application of information technology to reduce waste by increasing interaoperability, dated Jan. 1, 2011, pp. 1-137, Civil Engineering Master's These, Northeastern University, Boston, Massachusetts.

Ibrahiem Abdul Razak Alani et al., Artificial Intelligence Expert System For Minimizing Sold Waste During Highway Construction Activities, dated Mar. 18, 2009, pp. 1-4, Proceedings of the International MultiConference of Engineers and Computer Scientest 2009 vol. I IMECS, Hong Kong, China.

Latista Commissioning Mobile and Cloud Feature Overview, dated Feb. 21, 2013, all screens of video, Latista Software, Video available at http://www.youtube.com/watch?v=WOym6ngHKj8.

Latista Visual Punch List or Punch on Plan Features Overview, dated Feb. 21, 2013, all screens of video, YouTube, Latista Software, Video available at http://www.youtube.com/watch?v=9pX_FoGdVwg.

Latista Brings BIM to the Field, dated Dec. 5, 2013, all screens of video, Latista Software, Video available at http://www.forconstructionpros.com/video/11267932/video-lastista-brings-bim-to-the-field and http://www.youtube.com/watch?v=GOdDoyre_QU.

International Search Report, dated Mar. 17, 2015, pp. 1-2, International Application No. PCT/US2014/070519, International Search Authority—US.

\* cited by examiner

PROJECT MANAGEMENT SYSTEM PROVIDING DIGITAL FORM-BASED INSPECTIONS IN THE FIELD

CROSS REFERENCE TO RELATED APPLICATIONS

This application claims priority to provisional application Ser. No. 61/925,468, filed 9 Jan. 2014, which is incorporated by reference in its entirety.

FIELD

The present disclosure relates generally to project management, and, more particularly, to systems and methods for providing digital, e.g., Portable Document Format (PDF), form-based inspections in the field.

BACKGROUND

In general, project management is understood to include planning, organizing, motivating, and controlling resources to achieve specific goals. In the construction industry, for example, construction management firms may be engaged in medium and large projects (e.g., sport stadiums, hospitals and healthcare facilities, office buildings, power plants, manufacturing facilities, airports, seaports and railway terminals, multi-unit residential complexes, etc.). Throughout the entire process of construction (e.g., from planning to handover), large teams of construction professionals and specialists have to be managed so as to ensure that all aspects of the construction project (e.g., partnering, estimating, purchasing, scheduling, engineering, safety, community relations, etc.) go smoothly to produce high-quality projects on time.

Conventionally, coordinating such large teams involved a lot of paperwork, including documentation related to data in the field. This is especially true in performing field management, punch list management, quality, commissioning, turn-over and safety management, and warranty- and maintenance-related functions. Such documents include, but are not limited to, field inspections, punch lists, vendor lists, resource lists, and task lists. Consequently, firms have sought processes that keep their project coordinators and subcontractors on the job site working (i.e., building and maintaining), rather than in an office shuffling papers. Furthermore, the use of documentation may slow down productivity simply due to the fact that not all of the field personnel may have access to the recorded field data, thus possibly leading to work duplication, unnecessary communications, or other cost-increasing problems.

For example, one field management process includes inspections performed in the field. Inspections are used to assure that systems and components of a building or industrial plant are installed and tested according to the operational requirements of the client or final owner. Inspections are also relied upon so as to assure that jobsite procedures and controls, such as safety requirements and government inspections, are followed in a documented manner. The inspection process may include, but is not limited to, verifying subsystems for mechanical (HVAC), plumbing, electrical, fire/life safety, building envelopes, interior systems (example laboratory units), cogeneration, utility plants, sustainable systems, lighting, wastewater, controls, and building security to achieve the owner's project requirements as intended by the building owner and as designed by the building architects and engineers. The inspection process may also include verifying the presence of safety materials and adherence to local, state, or national government regulations.

Users in the construction industry may spend a significant amount of time filling out paper-based inspection forms. For example, inspection forms may include site-specific forms, company-specific forms, city-, county-, and state-specific forms, safety forms, inspection forms, and others. The look, feel, and layout of these forms may often be dictated to the user such that the user does not have much flexibility in modifying either the content or layout of the forms. Additionally, in some cases, each inspection form must be filled out while performing the inspection at the construction site and must be completed in a specific manner, verified, distributed and stored. The field personnel must generally follow a predetermined, controlled inspection workflow to maintain an accurate audit trail related to project safety and quality. Frequently the inspection workflow requires that different personnel in the inspection process fill out different parts of the forms. For example, any single inspection form may be partitioned into separate sections (e.g., Parts A-C), such that Part A may be filled out by a subcontractor providing information on the work to be inspected, Part B may be filled out by the inspector on the construction site, and Part C may be filled out by the project supervisor verifying the results. Completed inspection forms are archived at the end of the project as an important part of the project records. The paper-nature of these forms, coupled with formatting and content restrictions, make this a labor intensive process.

Completing inspections quickly and accurately is an important part of the overall construction schedule. As an example, the drywall for a region of the building cannot be installed until all the in-wall inspections (e.g., electrical and plumbing) for that region have been successfully completed and verified. However, current inspection processes relying on the use of paper-based inspection forms can be a particularly tedious and inefficient, thereby resulting in increased costs, time delays, as well as potential risks of injury due to miscommunication and delays in reporting the status of inspection for certain systems or areas of a project. Essentially the same inspection process may be utilized in many other industries such as shipbuilding, aircraft and aerospace systems manufacturing, mining, oil and gas drilling and exploration, etc. when inspections are being performed during field operations as a part of project management process to ensure quality and compliance of work performed.

SUMMARY

The present disclosure is directed to systems and methods for field management including management of construction jobsite operations. In one aspect, a system is configured to provide field management services and facilitate an online platform web-application for carrying out one or more functions related to field management. The system is configured for use by capital business owners, commissioning agents, third-party inspectors and construction management firms, installers of systems and subsystems and their subcontractors/vendors for management of the construction project, wherein the application optimizes a variety of field operations, improving performance and effectiveness of mobile workers.

The system generally includes one or more mobile devices configured to communicate with a remote server or cloud-based service. The mobile devices may generally include any mobile computing device configured to run the construction field management software thereon. For example, a mobile device consistent with the present disclosure may include a tablet PC or smartphone for field-based personnel and configured to synchronize with the server and/or cloud-based server and dynamically exchange field data related to one or more construction processes. Each mobile device may communicate with one another, by way of the server and/or cloud-based server, such that each field-personnel has access to ongoing constructions processes and related field data.

The mobile devices may be synchronized with the server and/or cloud-based service on a regular basis to make data records consistent and up-to-date. In a synchronization process, data record changes may be propagated from one mobile device to another, via the server or cloud-based service. In one aspect, such synchronization is based on a data record replication mechanism where all the necessary data records are transmitted to mobile devices in advance. The replication mechanism then assumes that all the mobile device users may work "off-line" and go "on-line" to connect to a server to "sync." Mobile device users may modify or delete existing data records and add new data records to the replicated data records in the course of their field work. All user-made modifications and replication of new data records may take place during next synchronization. Synchronization also may be used to initialize any newly-installed mobile device version of the application.

In one aspect, the system may include a field management system for executing the application, wherein the field management system may be implemented on each mobile device and/or the server and/or cloud-based service. In one aspect, the field management system includes an inspection management module for generally building accurate and interactive digital representations of paper forms, such as inspection forms, and providing user access to such forms when performing project management processes in the field, such as, for example, field inspections. The inspection management module is configured to provide a user with access to a digitized inspection form template, including question and associated answer fields, on their mobile device, upon which the user can interact with and record results of an inspection while on-site by way of their mobile device, rather than relying on paper-based forms.

The inspection management module is configured to provide both a simplified, easy-to-complete list of questions and answer fields displayed in a linear form view, as well as an interactive digital (e.g., PDF) form that replicates the original paper document. Each answer field may be a text field, a multiple choice selection field, a checkbox, or any other type of field. The linear form view may be any view of the form in a graphical user interface that may not appear identical to the original paper document. The layout of the fields may be different than in the original paper document. The linear form view may be rendered as a PDF view, an HTML (Hypertext Markup Language) view, a mobile application interface, or any other view in a graphical user interface. In the linear form view, the fields may be arranged linearly or in any other arrangement. The user may navigate through the fields linearly or in any order.

The replicated view (also referred to herein as a replicated layout view) may be displayed in a graphical form view, such as a PDF view, and may preserve the look, feel, and layout of the original paper-based form. The graphical form view may be any view of the form that is substantially similar to the original paper document through which form data may be received via a graphical user interface. The graphical form view may be rendered as a PDF view, an HTML (Hypertext Markup Language) view, a mobile application interface, or any other view in a graphical user interface. For example, The HTML view may include, for example, HTML fields overlaid on an image of the original paper-based form. The inspection management system allows the user to further toggle between the linear form and the graphical form views on the fly during an inspection process, thereby improving user interaction with and completion of inspection form. Although the system is capable of showing linear and graphical form views of the same form, in particular situations, the linear form view, the graphical form view or both may be desirable or preferred by a user based on a physical characteristic (e.g. display sizes, display resolutions, etc.), a performance of computers or mobile devices used by a particular user, or a relative complexity of the form itself. The preferred view may be set up for a particular form automatically based on a characteristic of the form or a user's computing device. For example, the linear form view may be selected as the preferred view for field users using mobile phones with small display. Alternatively or in addition, the preferred view may be set manually by a systems administrator when the form is created in the system.

Upon performing an inspection on a desired location, system, component, etc., the inspection management module is further configured to separate the inspection data from the inspection template form and store the inspection data in an issue transaction, or layer, associated with that particular inspection template form. For example, a safety inspection form may be filled out once a day on a job site so as to assure that safety practices are being met. Instead of creating and storing 365 individual files, each file including the safety inspection form and associated inspection data for any given day, the system is configured to store the inspection data separately from the safety inspection form and into associated inspection transactions or layers that can be overlaid on a single copy of the safety inspection form. By storing individual inspection layers, the system allows users to quickly view the inspection layers by filtering or sorting of the inspection data associated therewith. The inspection data may include, but is not limited to, inspection questions and answers, date and time the inspection was performed, the user who performed the inspection, the location of the inspection, the component, system, or area being inspected, the status of the inspection (e.g., open, closed, in progress, etc.), and other data related to the inspection.

The inspection template forms, as well as associated inspection data stored in separate inspection layers, may be stored in the cloud-based service to share with other users on their respective mobile devices, thereby allowing other distributed users to view the inspection forms and related inspection data layers. Accordingly, upon accessing inspection template forms, users may filter through different inspection data layers so as to quickly and efficiently obtain details regarding any single inspection and can be relied upon so as to ensure the inspections are occurring as planned.

The inspection management module is further configured to allow modification of inspection form templates, wherein a user having authority, such as a project coordinator or administrator, can customize one or more parameters of an inspection form template. For example, the system allows a user to customize the content and format of the inspection completion report, including cover page, completed inspection form, and details of any associated issues documented during the inspection. Furthermore, a user may restrict access to a specific inspection form by granting access to the inspection form to a desired few. Additionally, a user may define the specific issue categories that may be applicable to any specific inspection form.

The inspection management module is further configured to allow a user to create a customized workflow for the completion and tracking of an inspection form template. For example, each inspection template may be configured to programmatically progress through a pre-defined work flow, such as, for example, Requested→Scheduled→In process-→Passed (or Failed)→Approved. The predefined workflow can be tailored for each inspection template. For instance, the workflow can be simplified to not require an Inspection Request as the first step. Alternatively or in addition, the workflow may enable/disable one or more parts of the form for viewing and/or populating on one or more workflow steps.

Systems and methods consistent with the present disclosure provide an optimized and intuitive means of performing inspections in the field. The system allows users to quickly and efficiently access and toggle between a simplified, easy-to-complete list of questions and answer fields displayed in a linear form view, as well as an interactive graphical form completely replicated from the original paper document displayed in a graphical form view, thereby preserving the look, feel, and layout of the paper-based inspection form. This may allow a user to complete forms more legibly, which makes processing and tracking inspections easier, saving time and money. Furthermore, by storing inspection data as separate layers for the same inspection template, the system avoids treating each inspection form as a separate file, thus saving space and improving a user's interaction with the system, allowing users to filter and sort inspection data and reports in an efficient manner and keep inspection forms uncluttered and better organized.

Systems and methods consistent with the present disclosure may enable multiple users, each on different devices, to populate different parts of a single form. In other words, each user may populate different parts of the single form than the other user(s). The systems and methods may further merge the data entered by the multiple users into one populated form.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to systems and methods for construction field management. In some embodiments, the system is configured to provide field management services and facilitate an online platform web-application for carrying out one or more functions related to construction field management. The system is configured for use by capital business owners, construction management firms and their subcontractors/vendors for management of the construction project. The system is configured to optimize a variety of field operations, improving performance and effectiveness of mobile workers.

The system generally includes one or more mobile devices configured to communicate with a remote server or cloud-based service. The mobile devices may generally include any mobile computing device configured to run the construction field management software thereon. For example, a mobile device consistent with the present disclosure may include a tablet PC for field-based personnel configured to synchronize with the server and/or cloud-based server and dynamically exchange field data related to one or more construction processes. Each mobile device may communicate with one another, by way of the server and/or cloud-based server, such that each field-personnel has access to ongoing constructions processes and related field data.

The mobile devices may be synchronized with the server and/or cloud-based service on a regular basis to make data records consistent and up-to-date. In a synchronization process, data record changes may be propagated from one mobile device to another, via the server or cloud-based service. In one aspect, such synchronization is based on a data record replication mechanism where all the necessary data records are transmitted to mobile devices in advance. The replication mechanism then assumes that all the mobile device users may work "off-line" and go "on-line" to connect to a server to "sync." Mobile device users may modify or delete existing data records and add new data records to the replicated data records in the course of their field work. All user-made modifications and replication of new data records may take place during next synchronization. Synchronization also may be used to initialize any newly-installed mobile device version of the application.

In one embodiment, the system may include a field management system for executing the application. The field management system may include modules for Quality Management, Punch List Management, Safety Management, Items (e.g., Inventory) Management, Production Tracking, Commissioning, Document Management, Report Management, and Inspection Management. The field management system may be implemented on each mobile device and/or the server and/or cloud-based service.

The inspection management module is for generally building accurate and interactive digital representations of paper forms, such as inspection forms, and providing user access to such forms when performing project management processes in the field, such as, for example, field inspections. The inspection management module is configured to provide a user with access to a digitized inspection form template, including question and associated answer fields, on their mobile device, upon which the user can interact with and record results of an inspection while on-site by way of their mobile device, rather than relying on paper-based forms.

The inspection management module is configured to provide both a simplified, easy-to-complete list of questions and answer fields displayed in a linear form view, as well as an interactive graphical form completely replicated from the original paper document displayed in a graphical view, thereby preserving the look, feel, and layout of the paper-based inspection form. The inspection management system allows the user to further toggle between the linear form and graphical views on the fly during an inspection process, thereby improving user interaction with and completion of inspection form.

Upon performing an inspection on a desired location, system, component, etc., the inspection management module is further configured to separate the inspection data from the inspection template form and store the inspection data in a single issue transaction, or a layer, associated with that particular inspection template form. Each layer may be an object or a combination of objects in a database. Each object may be, for example, a table in a relational database, an object in an object database, a node in an XML database, or any other type of database object. Field data produced during inspections, for example, may be associated at the database level with a corresponding layer through one-to-one or one-to-many database relationships. For example, a safety inspection form may be filled out once a day on a job site so as to assure that safety practices are being met. Instead of creating and storing 365 individual files, each file including the safety inspection form and associated inspection data for any given day, the system is configured to store the inspection data separately from the safety inspection form and into associated inspection transactions or layers that can be overlaid on a single copy of the safety inspection form. By storing individual inspection layers, the system allows users to quickly view the inspection layers by filtering or sorting of the inspection data associated therewith. The inspection data may include, but is not limited to, inspection questions and answers, date and time the inspection was performed, the user who performed the inspection, the location of the inspection, the component, system, or area being inspected, the status of the inspection (e.g., open, closed, in progress, etc.), and other data related to the inspection.

A field may be considered "populated" or changed if a user specifically changed the field value from a default value. In response to a change in a field, a database record may be created or updated for the field. Absent a change in the field value, the form field may not have a database record. When a field has no corresponding database record, a default or empty value may be displayed. The default or empty value may be based on a form template data.

The process also allows managing user permissions to certain inspection data as different users should have different access, read, and/or edit permissions based on the respective user's role in the project management process. The inspection management module or other module may be configured to establish and manage permissions for individual user(s) or a group(s) of users to a selected layer and/or a part of the form.

The inspection management module may be further configured to enable multiple users, each on different devices, to populate different parts of a single form. In other words, each individual user may populate different parts of the single form than the other user(s). The inspection management module may merge the data entered by the multiple users into one populated form.

The inspection template forms, as well as associated inspection data stored in separate inspection layers, may be stored in the cloud-based service to share with other users on their respective mobile devices, thereby allowing other distributed users to view the inspection forms and related inspection data layers. Accordingly, upon accessing inspection template forms, users may filter through different inspection data layers so as to quickly and efficiently obtain details regarding any single inspection and can be relied upon so as to ensure the inspections are occurring as planned.

The inspection management module is further configured to allow modification of inspection form templates, wherein a user having authority, such as a project coordinator or administrator, can customize one or more parameters of an inspection form template. For example, the system allows a user to customize the content and format of the inspection completion report, including cover page, completed inspection form, and details of any associated issues documented during the inspection. Furthermore, a user may restrict access to a specific inspection form by granting access to the inspection form to a desired few. Additionally, a user may define the specific issue categories that may be applicable to any specific inspection form.

The inspection management module is further configured to allow a user to create a customized workflow for the completion and tracking of an inspection form template. For example, each inspection template may be configured to programmatically progress through a pre-defined work flow, such as, for example, Requested→Scheduled→In process-→Passed (or Failed)→Approved. The predefined workflow can be tailored for each inspection template. For instance the workflow can be simplified to not require an Inspection Request as the first step. Alternatively or in addition, as part of creating of the customized workflow, the inspection management module or a different module may enable/disable one or more parts of the inspection form or other form. A disabled part may be hidden or read only during performance of one or more steps of the customized workflow. An enabled part may be read only or accept data entry during performance of one or more steps of the customized workflow.

Systems and methods consistent with the present disclosure may provide an optimized and intuitive means of performing inspections in the field. The system allows users to quickly and efficiently access and toggle between a simplified, easy-to-complete list of questions and answer fields displayed in a linear form view, as well as an interactive graphical form completely replicated from the original paper document displayed in a graphical view, thereby preserving the look, feel, and layout of the paper-based inspection form. This may allow a user to complete forms more legibly, which makes processing and tracking inspections easier, saving time and money. Furthermore, by storing inspection data as separate layers for the same inspection template, the system avoids treating each inspection form as a separate file, thus saving space and improving a user's interaction with the system, allowing users to filter and sort inspection data and reports in an efficient manner and keep inspection forms uncluttered and better organized.

Figure 1:
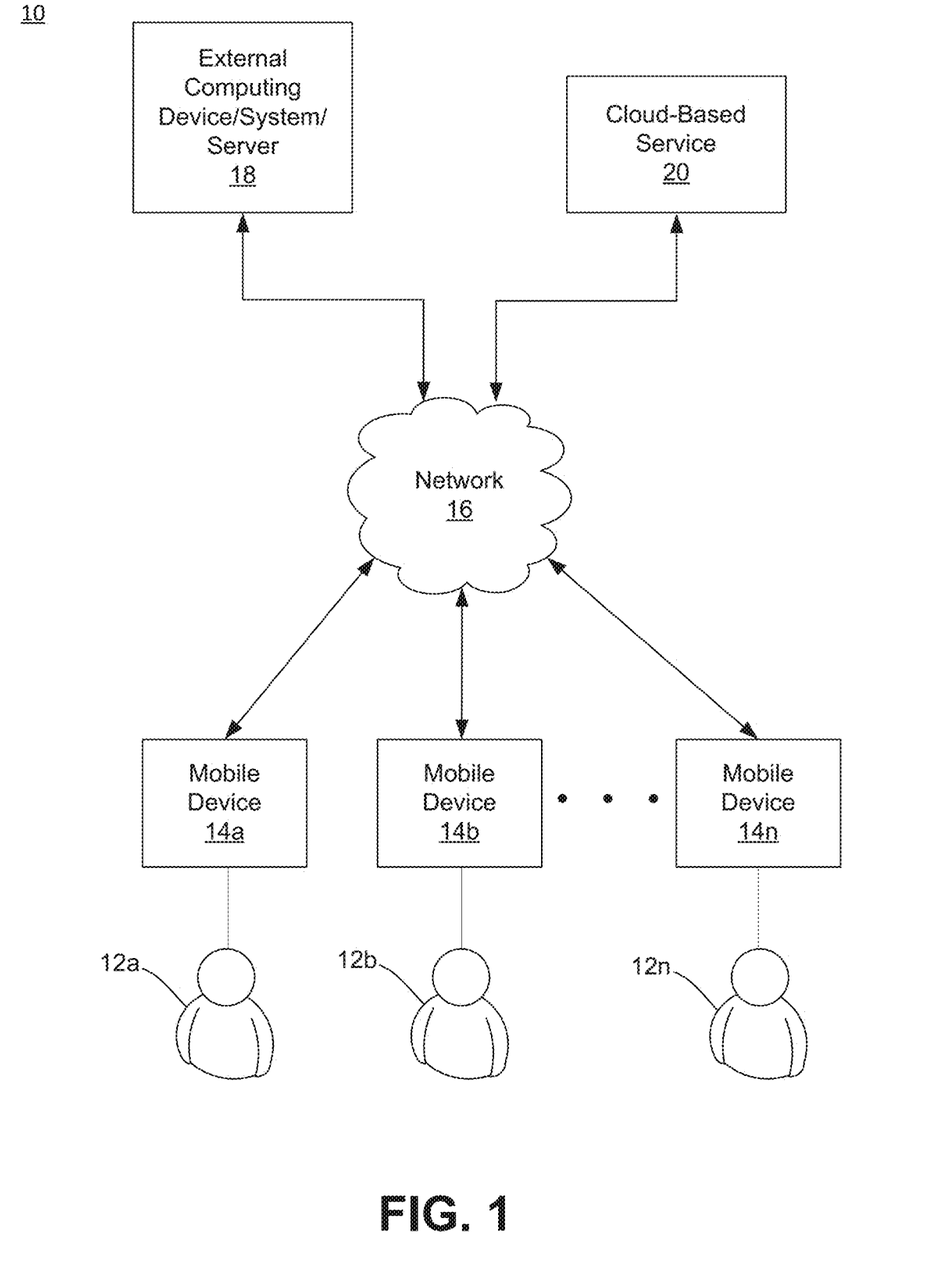
FIG. 1 is a block diagram illustrating one embodiment of an exemplary system for providing field management services and facilitating an online platform web-application for carrying out one or more functions related to construction field management.

Turning to FIG. 1, one embodiment of an exemplary system for providing field management services is generally illustrated. FIG. 1 presents an exemplary environment diagram 10 of various hardware components and other features.

As shown, data and other information and services are, for example, input by one or more users 12 (shown as users 12a-12n) and received by one or more associated mobile devices 14 (shown as mobile devices 14a-14n). The mobile devices 14 are configured to be communicatively coupled to an external device, system or server 18 and/or cloud-based service 20 via a network 16. In addition, or alternatively, the mobile devices 14 are configured to be communicatively coupled to one another via the network 16.

The mobile devices 14 may be embodied as any type of device for communicating with one or more remote devices/systems/servers and for performing the other functions described herein. For example, the mobile device 14 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, and/or any other computing device configured to store and access data, and/or to execute software and related applications consistent with the present disclosure.

In one aspect, mobile device 14 is a one of many commercially-available tablet PCs, notebook PCs, or convertible notebook PCs. Any of a wide range of mobile device may be used. As just a few examples, the mobile device may be an Android, iOS, or WP based smartphone; an Android or iOS based tablet computer, or any other portable device. The mobile device may be suitable for a construction jobsite where shock, extreme heat, cold, direct sunlight, dust, and rain are expected. Rugged, semi-rugged, and non-rugged tablet PCs—such as the Panasonic Toughbook, the Itronix GoBook, the Motion-Computing F5 and the Xplore Technologies iX104C2—typically offer the ability to enter data using an electronic pen, built-in software keyboard, regular external keyboard, mouse and voice dictation, and may be equipped with a digital camera. Such tablet PCs typically include the ability to program pen-activated shortcuts for complex information entry as in, for example, filling out an electronic form or report. Accordingly, systems and methods described herein, particularly the online platform web-application, are compatible with mobile operating systems (OS) for PC-based mobile devices, including, but not limited to, Android, Windows, and Blackberry. In one embodiment, the mobile device 14 may include a Windows Tablet running Windows 8 OS.

In other embodiments, the mobile device 14 is computer tablet or mobile phone having touchscreen capabilities. As one example, the mobile device 14 may be an Apple IPAD® device, Apple iPhone, Samsung Note, or an Android based device. Accordingly, the systems and methods described herein may execute on and may be configured to be compatible with Apple operating systems (OS), including iOS 7, 8, as well as prior and later versions, Windows OSs, Android OS, or any other OSs.

It should be understood that the term "data" means any information used in an aspect. Examples include, but are not limited to, input data by users, task data, checklist data, punch list data, standard templates or other standard information, standard report elements, data records, alerts and messages, system overhead information or other internal communications, etc.

The external computing device/system/server 18 may be embodied as any type of device, system or server for communicating with the mobile devices 14 and/or the cloud-based service 20, and for performing the other functions described herein. Examples embodiments of the external computing device/system/server 18 may be identical to those just described with respect to the mobile device 14 and/or may be embodied as a conventional server, e.g., web server or the like.

The network 16 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 14, between the mobile devices 14 and the external computing device/system/server 18 and/or cloud-based service 20, may be, in whole or in part, a wired connection.

The network 16 may be any network that carries data. Non-limiting examples of suitable networks that may be used as network 16 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), other networks capable of carrying data, and combinations thereof. In some embodiments, network 16 is chosen from the internet, at least one wireless network, at least one cellular telephone network, and combinations thereof. As such, the network 16 may include any number of additional devices, such as additional computers, routers, and switches, to facilitate communications. In some embodiments, the network 16 may be or include a single network, and in other embodiments the network 16 may be or include a collection of networks.

Figure 2:
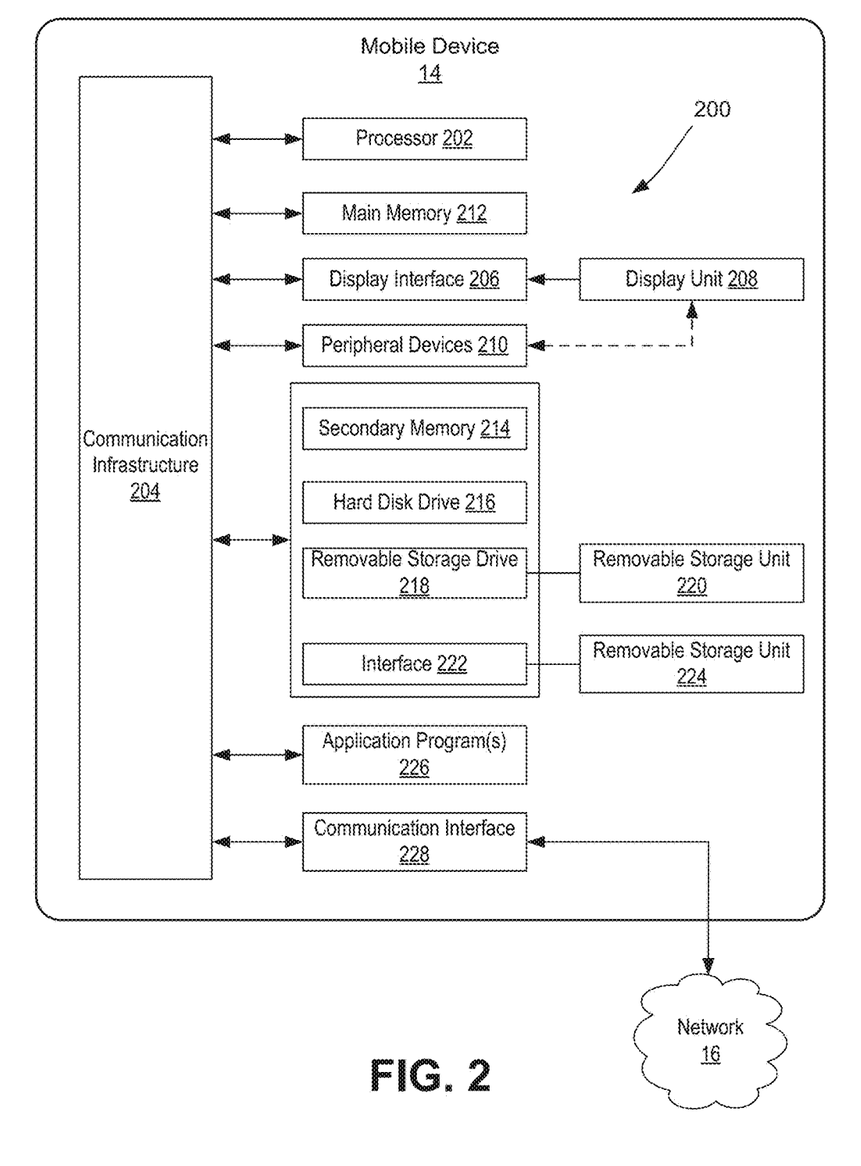
FIG. 2 is a block diagram illustrating at least one embodiment of a mobile device of the system of FIG. 1 consistent with the present disclosure.

As described in greater detail herein, a computing system (see FIG. 2) may be configured to carry out the functionality described herein (e.g., field management services and facilitation of software for carrying out one or more functions related to construction field management). One or more computing systems may be configured to carry out the functionality described herein. An example of a computer system 200 is shown in FIG. 2. The computing system 200 of FIG. 2 may be included within the mobile device 14, for example. Additionally, or alternatively, the computing system 200 may be included within the external computing device/system/server 18 and/or cloud-based service 20. The computing system 200 includes one or more processors, such as processor 202. Processor 202 is operably connected to communication infrastructure 204 (e.g., a communications bus, cross-over bar, or network). Various software aspects are described in terms of this exemplary computer system.

The computing system 200 may include display interface 206 that forwards graphics, text, and other data from communication infrastructure 204 (or from a frame buffer not shown) for display on display unit 208. The computing system further includes peripheral devices 210. The peripheral devices 210 may include one or more devices for interacting with the mobile device 14, such as a keypad, microphone, camera, one or more audio speakers, and other sensors. In one embodiment, the display unit 208 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 14, such as accessing and interacting with applications executed on the device 14.

The computing system 200 also includes main memory 212, such as random access memory (RAM), and may also include secondary memory 214. The main memory 212 and secondary memory 214 may be embodied as any type of device or devices configured for short-term or long-term storage of data such as, for example, memory devices and circuits, memory cards, hard disk drives, solid-state drives, or other data storage devices. In the illustrative embodiment, the mobile device 14 may maintain one or more application programs, databases, media and/or other information in the main and/or secondary memory 212, 214. The secondary memory 214 may include, for example, a hard disk drive 216 and/or removable storage drive 218, representing a floppy disk drive, a magnetic tape drive, an optical disk drive, etc. Removable storage drive 218 reads from and/or writes to removable storage unit 220 in any known manner. The removable storage unit 220 may represents a floppy disk, magnetic tape, optical disk, etc. which is read by and written to by removable storage drive 218. As will be appreciated, removable storage unit 220 includes a computer usable storage medium having stored therein computer software and/or data.

In alternative embodiments, the secondary memory 214 may include other similar devices for allowing computer programs or other instructions to be loaded into the computing system 200. Such devices may include, for example, a removable storage unit 224 and interface 222. Examples of such may include a program cartridge and cartridge interface (such as that found in video game devices), a removable memory chip (such as an erasable programmable read only memory (EPROM), or programmable read only memory (PROM)) and associated socket, and other removable storage units 224 and interfaces 222, which allow software and data to be transferred from removable storage unit 224 to the computing system 200.

The computing system 200 may also include one or more application programs 226 directly stored thereon. The application program(s) 226 may include any number of different software application programs, each configured to execute a specific task related to field management. For example, the application program 226 may include construction field management software for providing field management services and facilitating an online platform web-application for carrying out one or more functions related to construction field management.

As described in greater detail herein, in one embodiment, the application program 226 may include graphical form viewing software configured to display a digital rendering of a paper-based document (e.g., inspection form) for display on the display unit 208 and further allow user interaction with the digital graphical form. Examples of the graphical form viewing software may include PDF viewing software, HTML browser software, and/or any other software for interacting through the graphical form view. The application program 226 may include other viewing software, in addition to the graphical form viewing software.

The computing system 200 may also include a communications interface 228. The communications interface 228 is configured to allow data to be transferred between the computing system 200 and external devices (other mobile devices 14, external computing device/system/server 18, cloud-based service 20). Examples of communications interface 228 may include a modem, a network interface (such as an Ethernet card), a communications port, a Personal Computer Memory Card International Association (PCMCIA) slot and card, etc.

Computer programs (also referred to as computer control logic) may be stored in main memory 212 and/or secondary memory 214 or a local database on the mobile device 14. Computer programs may also be received via communications interface 228. Such computer programs, when executed, perform the features discussed herein. In particular, the computer programs, including application programs 226, when executed, perform the features described in this application. Accordingly, such computer programs represent controllers of computer system 200.

In one embodiment, software may be stored in a computer program product and loaded into the computing system 200 using removable storage drive 218, hard drive 216 or communications interface 228. The control logic (e.g., software), when executed by processor 202, causes processor 202 to perform the functions described herein.

Another embodiment uses hardware components such as application specific integrated circuits (ASICs). Implementation of the hardware state machine so as to perform the functions described herein will be apparent to persons skilled in the relevant art(s).

In yet another embodiment, a combination of both hardware and software is used to implement the functions described.

Figure 3:
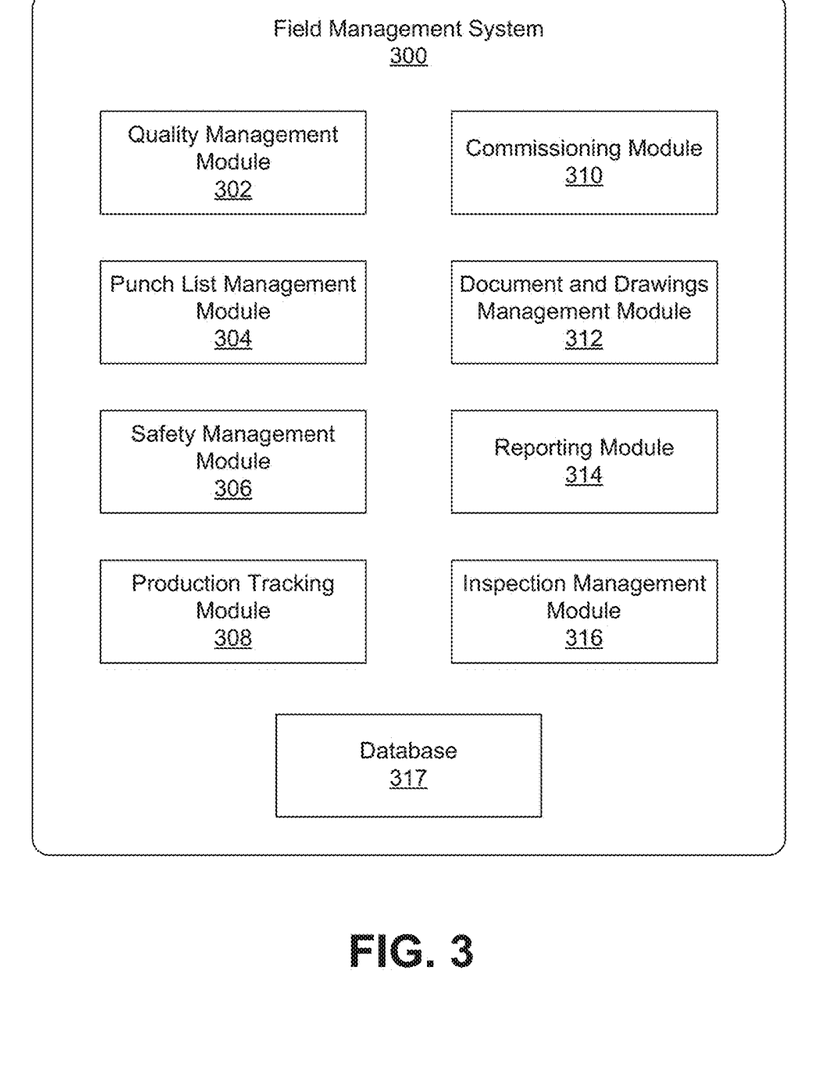
FIG. 3 is a block diagram illustrating an exemplary embodiment of a field management system for providing mobile-based field management services and communication between the mobile devices and the external computing device/system/server and/or the cloud-based service of FIG. 1.

Referring to FIG. 3, an exemplary embodiment of a field management system 300 is generally illustrated. The field management system 300 is configured to generally provide one or more field management services, including, but not limited to, issue tracking, field reporting, materials tracking, safety, quality assurance (QA) and quality control (QC), work list, commissioning, punch list, production tracking, document and drawings management, and field inspection. Accordingly, the field management system 300 may include a quality management module 302, punch list management module 304, safety management module 306, production tracking module 308, commissioning module 310, document and drawings management module 312, reporting module 314, and inspection management (BIM) module 316. Each of the modules 302-316 is configured to provide users, when executing the software application, access to and exchange of field data in conjunction with the desired process. The field management system 300 further includes a database 317 for storing resources related to each of the field management services. The resources may include, but are not limited to, checklists, checkboxes, descriptions, data items, information templates, equipment lists, report templates, histories, images, etc.

The field management system 300 is generally configured to communicate and operate in conjunction with the computing system 200 of FIG. 2. Accordingly, in some embodiments, the field management system 300 is incorporated within the mobile devices 14. Additionally, or alternatively, the field management system 300 may be part of the external device, system or server 18 and/or cloud-based service 20.

Figure 4:
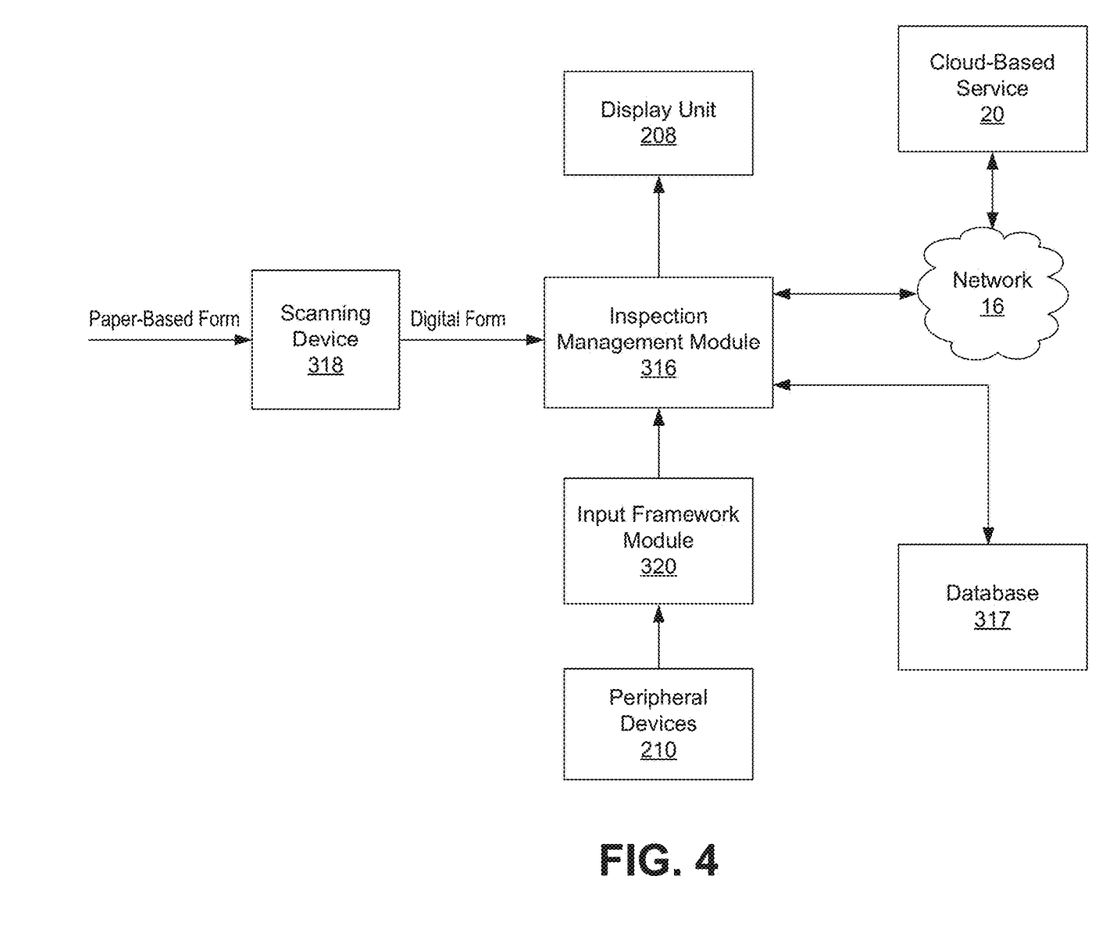
FIG. 4 is a block diagram illustrating a portion of the field management system of FIG. 3 in greater detail.

FIG. 4 is a block diagram illustrating the inspection management module 316 of the field management system 300 of FIG. 3 in greater detail. As previously described, one field management process includes inspection performed in the field. Field inspections are relied upon to assure that systems and components of a project, such as construction of a building or industrial plant, are installed and tested according to the operational requirements of the client or final owner. Inspections are also relied upon so as to assure that jobsite procedures and controls, such as safety requirements and government inspections, are followed in a documented manner. In many cases, a paper-based inspection form is used by personnel during the inspection process. However, paper-based forms have drawback, as previously discussed. The inspection management module 316 is configured to build and provide accurate and interactive digital representations of paper-based forms, such as inspection forms, and provide user access to such inspection forms when performing a field inspection. In particular, the inspection management module 316 is configured to provide a user with access, via their mobile device 14, to a digitized inspection form template, including question and associated answer fields, upon which the user can interact with and record results and data of an inspection while on-site by way of their mobile device 14, rather than relying on paper-based forms.

As shown in FIG. 4, the inspection management module 316 is configured to receive a digital form of a paper document based on a scan of the paper document with a scanning device 318. In particular, a paper inspection form may be scanned by the scanning device 318, which optically scans the paper document, including images, printed text, handwriting, etc., and further converts the paper document into the digital inspection graphical form, such as a digital PDF document. The scanning device 318 communicates the scan data over a scanning interface to the inspection management module 316. Accordingly, the scanning device 318 may include software configured to convert a scanned image into a digital representation, such as a Portable Document Format (PDF) document compatible with Adobe Acrobat™ standards. Additionally, or alternatively, the inspection management module 316 may be configured to receive data files of inspection forms in other file formats (e.g., DOC, XLSM, PPT, GIF, JPEG, MPEG, etc.) from the database 317, for example, and/or the cloud-based service 20, and further convert such files into a PDF file.

Upon receiving the digital inspection graphical form, the inspection management module 316 is configured to analyze the graphical form and further identify data fields defined therein to be completed by a user during the inspection process. The inspection management module 316 is configured to create an interactive graphical inspection form based on the identified data fields, resulting in the labelling of questions and generating associated answer fields, which may include text fields of various lengths, date fields, check boxes, radio buttons, and other commonly encountered answer formats. The inspection management module 316 may further be configured to allow users to define information to be automatically populated within the answer fields. Upon generating a digital representation of the form, such as a PDF inspection form, the digital representation of the form may be stored for later access and used by personnel in the field.

As described in greater detail herein, the inspection management module 316 is configured to provide a user in the field with access to an interactive digital (e.g., PDF) inspection form via their mobile device 14. In particular, the user may be provided with a graphical user interface (GUI) on the display 208 of their mobile device 14, wherein the user can view and interact with one of a plurality of digital graphical inspection forms. The user may interact with the graphical inspection form by way of user input in the form of user commands from the one or more peripheral devices 210 (e.g., touch-based input on the display, keypad/board commands, image data, audio data, etc.). The peripheral devices 210 may, in turn, provide user input to an input framework module 320. The input framework module 320 may include custom, proprietary, known and/or after-developed code (or instruction sets) that are operable to receive the user input and further determine the type of input (e.g., touch input, image, audio, etc.). Accordingly, the user may interact with the GUI, specifically the graphical form so as to fill in answer fields and the like. Additionally, the inspection management module 316 is configured to provide a user with two different views of the same graphical inspection form. In particular, the GUI provides the user with tool for toggling between a linear form view, which is a simplified, easy-to-complete list of questions and answer fields, and a graphical view, which is an interactive graphical inspection form completely replicated from the original paper document, preserving the look, feel, and layout of the paper-based inspection form. Additionally, the GUI may provide the user with other tool and options for accessing and sorting or filtering inspection templates and associated inspection data, as described in greater detail herein.

Upon performing an inspection on a desired location, system, component, etc., the inspection management module 316 is further configured to store the inspection results (data). The inspection data, as well as inspection form templates, may be stored in the cloud-based service 20 to share with other users on their respective mobile devices 14, thereby allowing other distributed users to view the inspection forms and related inspection data. Accordingly, upon accessing inspection template forms, users may filter through different inspection data layers so as to quickly and efficiently obtain details regarding any single inspection and can be relied upon so as to ensure the inspections are occurring as planned.

The inspection management module 316 may be further configured to produce interactively a paper-based document or a static electronic document that includes results of one or more inspections conducted or/and pending for a set of items or objects. The set of items or objects may be objects that are similar to each other, such as an electrical panel, a power generator, and an HVAC system. The paper-based document or the static electronic document may show, for example, a matrix or table that includes inspected/inspecting objects (in rows) and applicable inspection form data for each inspected/inspecting object (in columns).

The static electronic document or documents produced by the inspection management module 316 may be created periodically manually by a user or automatically on a periodic basis, such as once a day, once a week, or once a month. The inspection management module 316 may store the document(s) in the system or in any other internal or external electronic files repository thereby preserving current state of a project at a particular moment of time.

Figure 5:
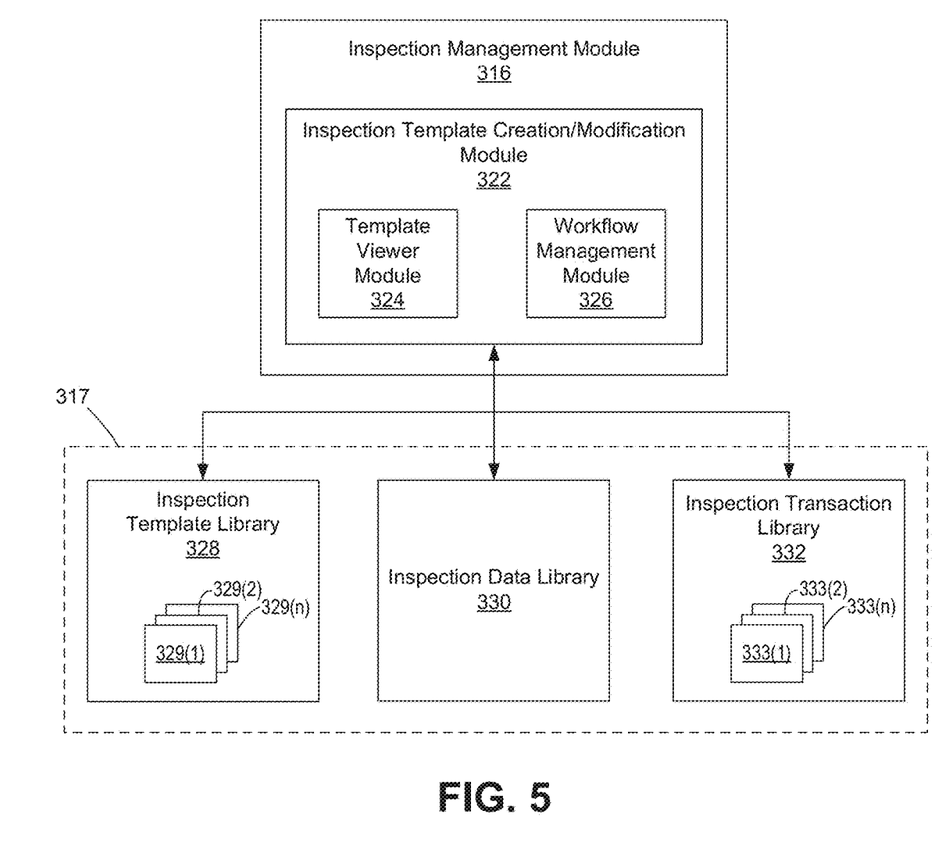
FIG. 5 is a block diagram illustrating the inspection management module of FIG. 4 in greater detail.

FIG. 5 is a block diagram illustrating the inspection management module 316 of FIG. 4 in greater detail. As shown, the inspection management module 316 includes an inspection template creation and modification module 322 configured to build and/or modify inspection form templates from uploaded digital inspection forms. In particular, the inspection template creation and modification module 322 is configured to analyze an imported graphical form, identify data fields defined therein to be completed by a user during the inspection process, and create an interactive graphical form based on the identified data fields.

In one embodiment, the inspection template creation and modification module 322 may be configured to allow users to define information to be automatically populated within the answer fields. For example, a data field on a form can use two types of automation (or a combination of both): data automatically populated by the application; or user selections based on a defined set of selection options. For data automatically populated, the inspection template creation and modification module 322 is configured to use a set of tags to specify the information for the application to automatically populate in a data field. For user selected field options, a user is allowed to define data fields for presenting a subsequent user with a set of options from which they can select a response based on a set of tags. The set of tags for automatically populated options may include, but are not limited to, the following:

{inspector_name}—name of a person who is assigned to inspection as an inspector
{inspection_location}—area inspected (Inspections only) presented as full path
{inspection_project}—project name, which is useful for forms that are used for multiple projects
{inspection_project_id}—project abbreviation (ID), which is useful for forms that are used for multiple projects
{inspection_template}—the name of the inspection template used to create the inspection
{item_name}—name of an item the inspection form is created for
{item_full_}—name of an item the inspection/form is created
{item_guid}—GUID field of an item the inspection/form is created for
{item_pn}—Part Number (P/N) field of an item the inspection/form is created for
{item_sn}—Serial Number (S/N) field of an item the inspection/form is created for
{item_custom1}—Custom Field 1 for an item the inspection/form is created for that can be created for all custom fields (1-5) e.g. {item_custom3} for custom field 3
{today}—current date (Inspections and Commissioning forms)

The set of tags for user selected field options may include, but are not limited to, the following:

_date_—displays a calendar from which the user selects a date that display in the format of dd/mm/yyyy
_location_—opens the Area Tree to allow users to select an area and populates the field with the full area name (including parents) upon selection
_contractor_—displays the companies/contacts available in the project to allow users to select a company or contact
_team_member_—displays all System Users to allow users to select users for assignment to the project
_item_—opens the Items Tree to allow users to select and item and displays the item with parent items
_inspection_number_—populates the field with the Inspection Number (e.g. inspection unique ID)

Figure 6:
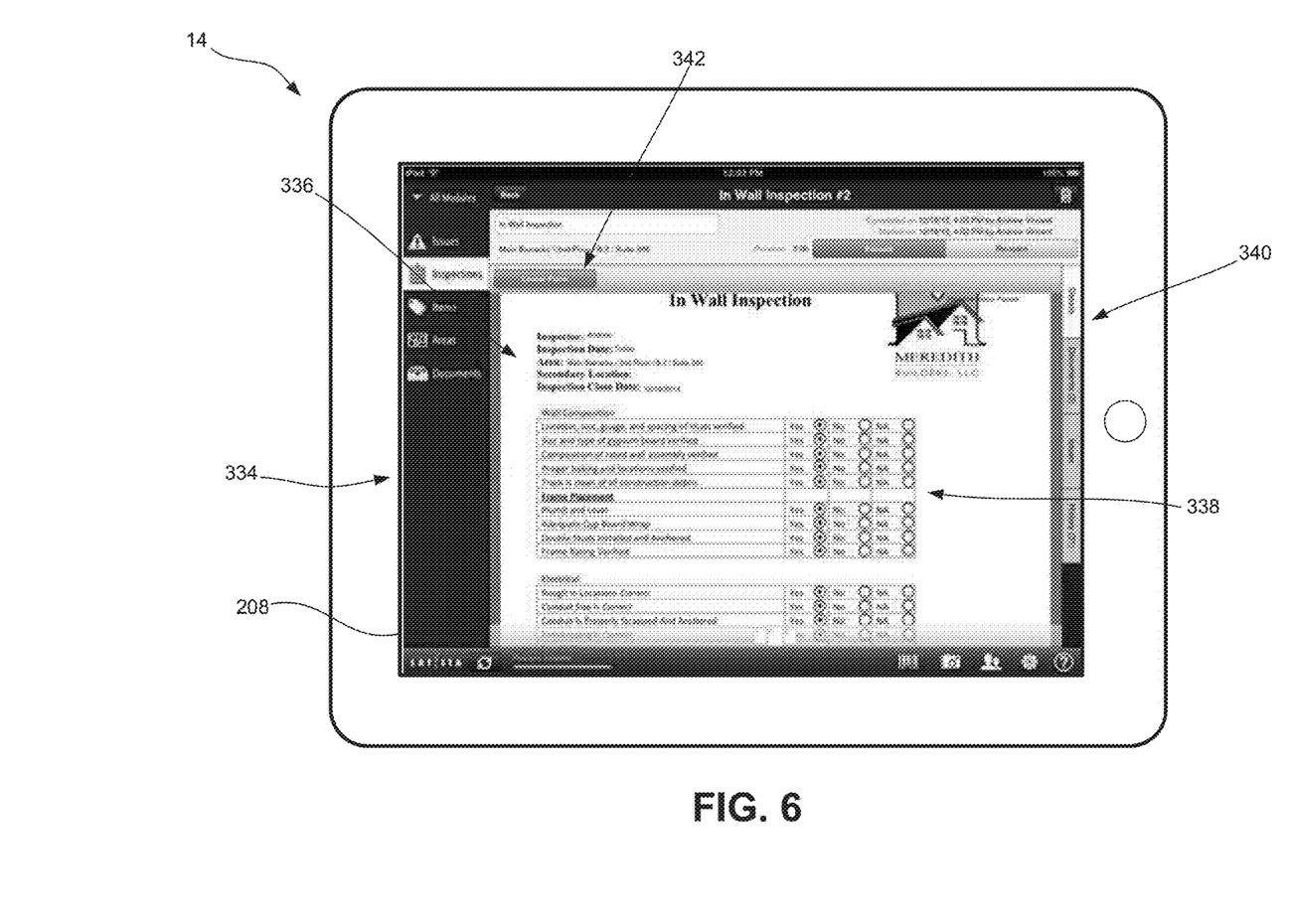
FIG. 6 illustrates the presentation of a digital inspection form presented in a linear form view on a touchscreen display of a mobile device consistent with the present disclosure.

The inspection template creation/modification module 322 is further configured to generate both a linear form configuration and a graphical form configuration of any particular inspection form template. The linear form configuration is a simplified, easy-to-complete interactive list of questions and answer fields displayed in a linear form view. The graphical form is an interactive form completely replicated from the original paper or file document displayed in a graphical view on a computer device's screen, having the look, feel, and layout of the original inspection form. In one embodiment, the inspection template creation/modification module 322 is configured to analyze metadata (e.g., question fields, answer fields, user input data, etc.) of the digital graphical form and create a corresponding linear-form view in which the questions and corresponding answer fields are shown in a linear list format (an example is shown in FIG. 6). The inspection template creation/modification module 322 includes a template viewer module 324 configured to allow a user to toggle between the linear-form view and the graphical form view.

The inspection template creation/modification module 322 is further configured to detect specific answer types to determine if a specific answer field should be pre-populated (e.g., with ITEM_NAME or TODAY) and/or to determine if the field has an automatic pop-up associated with it (e.g., LOCATION will pop-up the area tree, TEAM_MEMBER will pop-up a list of contacts assigned to the project). Metadata may be stored within an inspection data library 330, which may include pre-populated or automatically populated data (e.g., dates, names, contacts, items, areas, etc.).

Upon creating inspection form templates, each created template can be stored in the inspection template library 328, containing multiple templates 329(1)-329(n) from which a user may select for an inspection process.

The inspection template creation/modification module 322 is further configured to separate metadata from the graphical form itself, allowing questions and answers to be stored apart from the inspection template. This allows the inspection management module 316 to avoid treating each inspection as a separate file, thus saving space and speeding a user's interaction with the system. For example, upon performing an inspection on a desired location, system, component, etc., the template creation/modification module 322 is configured to separate inspection data 330 included on a given inspection form template 329 and store the inspection data in a single issue transaction layer 333 within an inspection transaction library 332, wherein the issue transaction layer 333 is associated with that particular inspection template form 329. The inspection data may include, but is not limited to, inspection questions and answers, date and time the inspection was performed, the user who performed the inspection, the location of the inspection, the component, system, or area being inspected, the status of the inspection (e.g., open, closed, in progress, etc.), and other data related to the inspection.

For example, a safety inspection form may be filled out once a day on a job site so as to assure that safety practices are being met. Instead of creating and storing 365 individual files (for each of the 365 days in the year), wherein each file includes the inspection form and associated inspection data for any given day, the system is configured to store the inspection data separately from the safety inspection form and into associated inspection transaction layers that can be overlaid on a single copy of the inspection form. By storing individual inspection transaction layers, a user may be able to quickly view different inspection transaction layers 333 (1)-333(n) by providing parameters for filtering or sorting the associated inspection data 330 corresponding to a single inspection form template 329, and thereby locating a matching inspection layer. For example, for each inspection transaction layer, the form field name and form field value data may be stored to allow for data mining and analysis of such data. This method of data mining would not be possible of the data was stored as embedded values on the inspection form itself.

The inspection template creation/modification module 322 is further configured to allow modification of inspection form templates 329, wherein a user having authority, such as a project coordinator or administrator, can customize one or more parameters of an inspection form template 329. For example, the inspection template creation/modification module 322 allows a user to customize the content and format of an inspection completion report, including cover page, completed inspection form, and details of any associated issues documented during the inspection. Furthermore, a user may restrict access to a specific inspection form by granting access to the inspection form to a desired few. Additionally, a user may define the specific issue categories that may be applicable to any specific inspection form.

The inspection template creation/modification module 322 includes a workflow management module 326 configured generate a user-defined workflow based on input from a user 12, generally in control of and/or having responsibility for overseeing and managing one or more field management services. For example, systems and methods consistent with the present disclosure may allow a project coordinator to create a specific workflow for the completion and tracking of an inspection form template. For example, each inspection template may be configured to programmatically progress through a pre-defined work flow, such as, for example, Requested→Scheduled→In process→Passed (or Failed) →Approved. The predefined workflow can be tailored for each inspection template. For example, the workflow can be simplified to not require an Inspection Request as the first step. The workflow management module 326 may enable/disable one or more parts of the form for viewing and/or populating during performance of one or more workflow steps.

The inspection template forms 329, as well as associated inspection data 330 stored in separate inspection transaction layers 333, may be stored in the cloud-based service 320 to share with other users on their respective mobile devices 14, thereby allowing other distributed users to view the inspection forms and related inspection data transaction layers. In particular, the inspection form templates, inspection data, and inspection data transaction layers are effectively synchronized from the cloud-based service 20 to a user's mobile device 14 in the field, allowing users to easily start an inspection and fill out the form, view the status of all inspections, complete inspections, view associated completion reports, and filter through inspection data transaction layers.

FIG. 6 illustrates the presentation of a digital inspection form 336 presented in a linear form view on a touchscreen display 208 of a mobile device 14 consistent with the present disclosure. As shown, an inspection management interface 334 on the display 208 may provide the user with a linear form view of an inspection form 336. The linear form view generally provides a list of questions and answer fields. Additionally, the inspection form 336 includes other inspection data, such as the name of the inspector, the date of inspection, the specific area being inspected, and the close date of the inspection. The interface 334 further provides a variety of tools or options from which the user may select. For example, the interface 334 provides selection tabs 340 configured to allow a user to sort through different aspects of any particular inspection form. Additionally, the interface 334 provides a template view toggle 342, allowing the user to alternate between the linear form view (shown) and the graphical form view (not shown). The interface 334 may further include filtering tools (not shown) in which the user may filter through different inspection data layers of any given inspection form, so as to quickly and efficiently obtain details regarding any single inspection, such that the user can check to see if are occurring as planned.

Systems and methods consistent with the present disclosure provide an optimized and intuitive means of performing inspections in the field. The system allows users to quickly and efficiently access and toggle between a simplified, easy-to-complete list of questions and answer fields displayed in a linear form view, as well as an interactive graphical form completely replicated from the original paper document displayed in a graphical view, thereby preserving the look, feel, and layout of the paper-based inspection form. This may allow a user to complete forms more legibly, which makes processing and tracking inspections easier, saving time and money. Furthermore, by storing inspection data as separate layers for the same inspection template, the system avoids treating each inspection form as a separate file, thus saving space and improving a user's interaction with the system, allowing users to filter and sort inspection data and reports in an efficient manner and keep inspection forms uncluttered and better organized.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

The methods, modules, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
  a communication interface;
  a scanning interface configured to receive a scanned version of an inspection form for a field inspection;
  a memory; and
  a processor in communication with the memory, the scanning interface, and the communication interface;
  the memory having stored therein:
    the scanned version obtained from the scanning interface; and
    an inspection management module for execution by the processor, the inspection management module configured to:
      transform the scanned version into an interactive digital representation of the scanned version, the interactive digital representation comprising:
        a linear form view of the inspection form comprising a list of questions and answer fields; and
        a layout replicated view of the inspection form that is replicated from the inspection form and displayable in a graphical view to preserve a look and layout of the inspection form in its original paper-based form;
      store the interactive digital representation in an inspection template library;
      provide the interactive digital representation comprising the linear form view and the layout replicated view to a remote device for use during the field inspection through the communication interface, wherein the interactive digital representation is configured to be displayed and toggled between the linear form view and the layout replicated view based on a user selection on the remote device;
      receive the interactive digital representation including inspection data that was used to complete the interactive digital representation during the field inspection using at least one of the linear form view or the layout replicated view through the communication interface;
      separate the inspection data from the interactive digital representation; and
      store the inspection data in an inspection layer in an inspection transaction library separate from the interactive digital representation in the inspection template library, where:
        the inspection transaction library comprises individual inspection transaction layers, each corresponding to inspection data generated during a different inspection, and the individual inspection transaction layers are configured to be overlaid on a single instance of at least one of the linear form view or the layout replicated view.

2. The system of claim 1, where the inspection management module is further configured to accept a filter parameter defined for the interactive digital representation.

3. The system of claim 1, where the inspection management module is configured to transform by:
  associating an information tag to the interactive digital representation that specifies an automatically populated data field within the interactive digital representation.

4. The system of claim 1, where the inspection management module is configured to transform by:
  associating an information tag to the interactive digital representation that specifies a data field within the interactive digital representation for which there are a pre-defined set of selection options.

5. The system of claim 1, where the inspection management module is configured to:
  receive the interactive digital representation including the inspection data from multiple users, a first portion of the interactive digital representation completed by a first user and a second portion of the interactive digital representation completed by a second user; and
  merge the inspection data received from the first user and the second user.

6. A method comprising:
  receiving a scanned version of an inspection form for a field inspection;
  storing the scanned version in a memory;
  transforming the scanned version into an interactive digital representation of the scanned version, the interactive digital representation comprising:
    a linear form view of the inspection form comprising a list of questions and answer fields displayed; and
    a layout replicated view of the inspection form that is replicated from the inspection form and displayable in a graphical form view to preserve a look and layout of the inspection form in an original paper-based form;
  storing the interactive digital representation in an inspection template library;
  providing the interactive digital representation comprising the linear form view and the layout replicated view to a remote device for use during the field inspection, wherein the interactive digital representation is configured to be displayed and toggled between the linear form view and the layout replicated view based on a user selection on the remote device;
  receiving the interactive digital representation including inspection data that was used to complete the interactive digital representation during the field inspection using at least one of the linear form view or the layout replicated view;
  separating the inspection data from the interactive digital representation; and
  storing the inspection data in an inspection layer in an inspection transaction library separate from the interactive digital representation in the inspection template library, where:
    storing the inspection data comprises storing, in individual inspection transaction layers, each corresponding to inspection data generated during a different inspection, and the individual inspection transaction layers are configured to be overlaid on a single instance of at least one of the linear form view or the layout replicated view.

7. The method of claim 6, further comprising:
accepting a filter parameter defined for the interactive digital representation.

8. The method of claim 7, further comprising:
identifying a matching inspection layer that meets the filter parameter in the inspection transaction library.

9. The method of claim 8, further comprising:
retrieving the matching inspection layer and providing the matching inspection layer for display in association with at least one of the linear form view or the layout replicated view.

10. The method of claim 6, where transforming comprises:
associating an information tag to the interactive digital representation that specifies an automatically populated data field within the interactive digital representation.

11. A system comprising:
a communication interface configured to receive an interactive digital representation of a paper inspection form for a field inspection;
an input interface;
a display;
a memory; and
processor in communication with the memory, the display, and the communication interface;
the memory having stored therein:
the interactive digital representation; and
an inspection management module for execution by the processor, the inspection management module configured with executable instructions that when executed by the processor cause the processor to:
provide a toggling tool for toggling between (i) a linear form view comprising a list of questions and answer fields based on the paper inspection form, and (ii) a layout replicated view that is replicated from the paper inspection form and displayable in a graphical form view to preserve a look and layout of the paper inspection form;
accept, from the input interface, a view selection type via the toggling tool;
when the view selection type is a linear form type, present on the display the interactive digital representation in the linear form view;
when the view selection type is a replicated form type, present on the display the interactive digital representation in the layout replicated view that replicates the paper inspection form;
accept, during the field inspection and through the input interface, inspection data used to complete the interactive digital representation using the linear form view when the view selection type is the linear form type or using the layout replicated view when the view selection type is the replicated form type;
separate the inspection data from the interactive digital representation;
synchronize the inspection data through the communication interface to a remote storage system; and
present, on the display, individual inspection transaction layers overlaid on a single instance of at least one of the linear form view or the layout replicated view, where each individual inspection transaction layer corresponds to inspection data generated during a different inspection;
wherein the instructions are configured to cause the inspection data to be stored in an inspection layer in an inspection transaction library separate from the interactive digital representation in an inspection template library, where the instructions cause the processor to:
store the inspection data by storing, in individual inspection transaction layers, each corresponding to inspection data generated during a different inspection, and
configure the individual inspection transaction layers to be overlaid on a single instance of at least one of the linear form type or the layout replicated view.

12. The system of claim 11, where the inspection management module is further configured to:
accept a filter parameter selection defined for the interactive digital representation, through the input interface;
communicate the filter parameter selection to the remote storage system; and
receive from the remote storage system, in response to communicating the filter parameter selection, a matching inspection layer that meets the filter parameter selection from an inspection transaction library.

13. The system of claim 11, where the inspection management module is further configured to:
present a pre-defined set of selection options on the display for completing a data field within the interactive digital representation in response to an information tag associated to the interactive digital representation that specifies that the data field has the pre-defined set of selection options for completion.

14. The system of claim 11, where the inspection management module is further configured to:
establish and manage permissions for one or more individual users or one or more groups of users to a selected layer or a selected part of the interactive digital representation.

15. The system of claim 11, where the inspection management module is further configured to:
produce interactively a paper-based document or a static electronic document that includes a result of inspections at least one of conducted or pending for a set of objects.

16. The system of claim 15, where:
the static electronic document is created periodically and stored, and
the stored static electronic document preserves a state of a project at a moment of time.

17. The system of claim 11, where the inspection management module is further configured to:
receive the interactive digital representation in the linear form view and in the layout replicated view; and
determine the view selection type between the linear form view and the layout replicated view based at least on physical characteristics of the display.

18. The system of claim 11, where the inspection management module is further configured to:
receive the interactive digital representation in the linear form view and in the layout replicated view; and
determine a default view between the linear form view and the layout replicated view based at least upon a display parameter of a remote device that is to display the interactive digital representation.

* * * * *